United States Patent
Holley et al.

(10) Patent No.: US 10,526,192 B2
(45) Date of Patent: Jan. 7, 2020

(54) UNIVERSAL ADAPTER

(71) Applicant: Tuthill Corporation, Fort Wayne, IN (US)

(72) Inventors: Brock E. Holley, Fort Wayne, IN (US); Thomas R. Headley, Roanoke, IN (US); Benjamin R. Freiburger, Yoder, IN (US); Matthew H. Gevers, Fort Wayne, IN (US)

(73) Assignee: Tuthill Corporation, Fort Wayne, IN (US)

( * ) Notice: Subject to any disclaimer, the term of this patent is extended or adjusted under 35 U.S.C. 154(b) by 0 days.

(21) Appl. No.: 15/937,923

(22) Filed: Mar. 28, 2018

(65) Prior Publication Data

US 2018/0282145 A1 Oct. 4, 2018

Related U.S. Application Data

(60) Provisional application No. 62/479,557, filed on Mar. 31, 2017.

(51) Int. Cl.
  *B64D 7/02* (2006.01)
  *B67D 7/34* (2010.01)
  (Continued)

(52) U.S. Cl.
  CPC .......... *B67D 7/0294* (2013.01); *B67D 7/344* (2013.01); *B67D 7/741* (2013.01); *F16L 37/35* (2013.01); *B67D 7/36* (2013.01)

(58) Field of Classification Search
  CPC ...... B67D 7/0294; B67D 7/344; B67D 7/741; B67D 7/36; B67D 3/0032; B67D 3/0035;
  (Continued)

(56) References Cited

U.S. PATENT DOCUMENTS 2,770,161 A * 11/1956 Schutte .................. F16B 43/02
  411/533
3,425,473 A * 2/1969 Knowlton ............... F16B 37/02
  411/134

(Continued)

FOREIGN PATENT DOCUMENTS

DE    20 2006 014 061 U1    12/2006
DE    10 2009 019 933 A1    11/2010
(Continued)

OTHER PUBLICATIONS

International Search Report and Written Opinion, dated Jun. 19, 2018, PCT/US2018/025016.

(Continued)

*Primary Examiner* — Marina A Tietjen
*Assistant Examiner* — Stephanie A Shrieves
(74) *Attorney, Agent, or Firm* — Barnes & Thornburg LLP

(57) ABSTRACT

A universal closure valve adapter attachable to a neck wall of a first container that forms a periphery of an opening having a diameter. The universal closure valve adapter includes a closure valve assembly that is attachable to a closure valve assembly of a second container. A flange transversely extending from the closure valve assembly of the first container. The flange includes a plurality of tank neck engagement assemblies. Each of the plurality of tank neck engagement assemblies are spaced apart from each other about the flange.

7 Claims, 10 Drawing Sheets

(51) Int. Cl.
*B67D 7/74* (2010.01)
*F16L 37/35* (2006.01)
*B67D 7/02* (2010.01)
*B67D 7/36* (2010.01)

(58) Field of Classification Search
CPC .......... B67D 3/0029; B67D 7/42; B67D 7/02; B67D 7/74; F16L 37/35; F16L 25/065; F16L 25/08; F16L 41/086; F16L 41/14; F16L 41/10; F16L 23/00; F16L 23/08; F16L 23/10; B43L 25/007; B65D 47/046; B65D 81/32; B67C 3/0019; B67C 11/02; B65B 3/045; F17C 5/00; A61J 1/20; Y10T 292/218; Y10T 292/221; Y10T 292/223; Y10T 292/426; Y10T 403/7041; E05B 65/006; F16B 43/02; F16B 5/025; F16B 35/005
USPC ....... 141/319, 320, 363–366, 383, 384, 386; 285/404, 206, 219; 411/393, 537
See application file for complete search history.

(56) References Cited

U.S. PATENT DOCUMENTS

| | | | |
|---|---|---|---|
| 4,081,006 A | | 3/1978 | Crowell et al. |
| 4,313,477 A | | 2/1982 | Sebalos |
| 4,508,173 A | | 4/1985 | Read |
| 5,029,624 A | | 7/1991 | McCunn et al. |
| 5,641,012 A | | 6/1997 | Silversides |
| 5,947,171 A | | 9/1999 | Woodruff |
| 5,960,840 A | * | 10/1999 | Simmel ................ B67D 7/0294 141/346 |
| 5,996,653 A | | 12/1999 | Piccinino, Jr. |
| 6,032,691 A | * | 3/2000 | Powell .................... F16L 29/04 137/614.03 |
| 6,053,539 A | * | 4/2000 | Bravo .................... F16L 27/044 285/148.15 |
| 6,170,543 B1 | | 1/2001 | Simmel et al. |
| 6,220,482 B1 | | 4/2001 | Simmel et al. |
| 6,418,987 B1 | * | 7/2002 | Colasacco ............. B65B 39/001 141/319 |
| 7,121,437 B2 | | 10/2006 | Kasting |
| 7,392,922 B2 | | 7/2008 | Vanstaan et al. |
| 7,546,857 B2 | | 6/2009 | Chadbourne et al. |
| 7,686,194 B2 | | 3/2010 | Kasting |
| 8,925,593 B2 | | 1/2015 | Lamboux |
| 10,189,614 B2 | | 1/2019 | Pruiett |
| 2002/0139867 A1 | | 10/2002 | Bulloch et al. |
| 2015/0276069 A1 | | 10/2015 | Saragosa et al. |
| 2015/0321836 A1 | | 11/2015 | Speas |

FOREIGN PATENT DOCUMENTS

| | | |
|---|---|---|
| DE | 10 2015 103 754 B3 | 2/2016 |
| DE | 20 2013 103 516 U1 | 12/2018 |
| WO | WO 2011/058541 A1 | 5/2011 |
| WO | WO-2011058541 A1 * | 5/2011 ............. B65D 47/06 |

OTHER PUBLICATIONS

International Search Report and Written Opinion; Application No. PCT/US2018/015847; dated May 9, 2018.

International Search Report and Written Opinion of the International Searching Authority; Application No. PCT/US2017/033475; dated Aug. 14, 2017.

International Preliminary Report on Patentability and Written Opinion, Application No. PCT/US2017/033475; dated Nov. 20, 2018.

* cited by examiner

UNIVERSAL ADAPTER

RELATED APPLICATIONS

The present application relates to and claims priority to U.S. Provisional Patent Application, Ser. No. 62/479,557, filed on Mar. 31, 2017. The subject matter disclosed in that provisional application is hereby expressly incorporated into the present application.

TECHNICAL FIELD AND SUMMARY

The present disclosure relates to closed loop fluid transfer mechanisms, and particularly, to accessories related to transferring fluid between containers in a closed-loop system. The present disclosure includes universal adapter accessories that selectively attach to closed-loop receiving containers having openings of a variety of diameters.

Due to the dangers of certain chemical fluids, it is sometimes necessary to limit the fluids' ability to come into contact with any person or thing prior to its intended use. In some instances, however, such fluids need to be transferred from one container to another. Instances may arise where a hazardous fluid needs to be transferred from a bottle into a tank. This is why closed-loop fluid transfer systems have been developed over the years. These systems include dispensing caps with valves that attach to the receiving container to effectuate transfer between same without any fluid exiting the connection between the containers to the outside environment. The utility of these systems is they prevent opening the dispensing container until it connects with the receiving container.

Connectors have been developed to control dispensing such chemical and/or hazardous fluid. Examples include U.S. Pat. No. 5,960,840 ('840 patent), Controlled Product Dispensing System, issued Oct. 5, 1999, and U.S. Pat. No. 6,170,543 ('543 patent), Controlled Product Dispensing System, issued Jan. 9, 2001, the disclosures of which are herein incorporated by reference in their entirety. They disclose closure and valve adaptors that facilitate direct fluid transfer from one container to another. Additional embodiments related to closed-loop fluid systems may be found in U.S. Pat. No. 10,365,141B2, Titled: Accessories for Closed Loop Fluid Transfer System, issued Jul. 30, 2019; 62/429,341, Titled: Sealed Dispensing Mechanism From A Closed Loop Fluid System—Auto Close; 62/432,812, Titled: Dispensing Mechanism From A Closed Loop Fluid System; Free Flowing; 62/435,335, Titled: Dispensing Mechanism From A Closed Loop Fluid System—Auto Close, all now collectively U.S. Provisional Patent Application, Ser. No. 62/622,348 filed on Jan. 26, 2018, Titled: Sealed Dispensing Mechanisms For Closed Loop Fluid Systems; 62/452,496, Titled: Closed System Valve Assembly With Expanded Flow Path, now U.S. non-provisional patent application Ser. No. 15/882,106, all of the disclosures of all of these applications are herein incorporated by reference in their entirety as well.

An illustrative embodiment of the present disclosure provides a universal closure valve adapter attachable to a neck wall of a first container that forms a periphery of an opening having a diameter. The universal closure valve adapter comprises: a closure valve assembly that includes a valve member biased to a closed position, wherein the closure valve assembly is attachable to a closure valve assembly of a second container, wherein the closure valve assembly of the second container is configured to open the valve member of the closure valve assembly of the first container to form a closed-loop fluid transfer system between the first and second containers; a flange transversely extending from the closure valve assembly of the first container; wherein the flange includes a plurality of tank neck engagement assemblies; wherein each of the plurality of tank neck engagement assemblies are spaced apart from each other about the flange; wherein each of the plurality of tank neck engagement assemblies includes a swivel member and an elongated retaining member rotatably disposed through the swivel member and having a tip; wherein the swivel member of each of the plurality of tank neck engagement assemblies is pivotable with respect to the flange; wherein each of the elongated retaining members are movable through its corresponding swivel member through which the elongated retaining member is disposed such that the tip of the each of the elongated retaining members is movable toward and away from the neck wall that forms the periphery of the opening having a diameter; wherein the tip of the each of the elongated retaining members is movable so the tip of the each of the elongated retaining members engages the neck wall that forms the periphery of the opening having a diameter and secures the flange to the neck wall that forms the periphery of the opening having a diameter; and wherein the closure valve assembly is positioned in fluid communication with the opening having a diameter.

In the above and other embodiments, the universal closure valve adapter may further comprise: the neck wall that forms the periphery of the opening having a diameter that has a threaded surface such that the tip of the each of the elongated retaining members is engageable with the threaded surface; the each of the elongated retaining members has a threaded surface; the threaded surface of the each of the elongated retaining members is configured to engage a threaded surface of its corresponding swivel member through which the elongated retaining member is disposed so rotating the elongated retaining member moves the tip of the elongated retaining member either toward or away from the neck wall that forms the periphery of the opening having a diameter; the flange includes outward extending petals wherein each petal includes one of the plurality of tank neck engagement assemblies; the each of the plurality of tank neck engagement assemblies is located opposite each other; and the plurality of tank neck engagement assemblies are three tank neck engagement assemblies, wherein the three tank neck engagement assemblies are spaced apart from each other.

Another illustrative embodiment of the present disclosure provides a universal closure valve adapter attachable to a neck wall of a first container that forms a periphery of an opening having a diameter. The universal closure valve adapter comprises: a closure valve assembly that includes a valve member biased to a closed position, wherein the closure valve assembly is attachable to a closure valve assembly of a second container, wherein the closure valve assembly of the second container is configured to open the valve member of the closure valve assembly of the first container to form a closed-loop fluid transfer system between the first and second containers; a flange transversely extending from the closure valve assembly of the first container; wherein the flange includes a collar that extends from the flange and is sized to encircle and be spaced apart from the neck wall that forms a periphery of an opening having a diameter; a plurality of elongated engagement members, each of which is spaced apart from each other and each is disposed through the collar and movable toward and away from the neck wall that forms a periphery of an opening having a diameter; and wherein each of the plurality of elongated engagement members includes a tip that is movable so the tip of the each of the elongated engagement members engages the neck wall that forms the periphery of the opening having a diameter that secures the collar to the neck wall that forms the periphery of the opening having a diameter and the closure valve assembly is positioned in fluid communication with the opening having a diameter.

In the above and other embodiments, the universal closure valve adapter may further comprise: a plurality of nuts, the plurality of nuts are spaced apart from each other and each of the plurality of nuts is located in and movable within the collar, wherein the each of the elongated engagement members is disposed through a corresponding nut of the plurality of nuts in the collar and movable with its corresponding nut; the collar, including a plurality of slots, each of the plurality of slots retaining one of the plurality of nuts such that the each of the plurality of nuts are movable only within its corresponding slot; the neck wall that forms the periphery of the opening having a diameter has a threaded surface such that the tip of the each of the elongated engagement members is engageable with the threaded surface; the each of the elongated engagement members has a threaded surface; and the threaded surface of the each of the elongated engagement members is configured to engage a threaded surface of its corresponding nut through which the elongated engagement member is disposed so rotating the elongated engagement member moves the tip of the elongated engagement member either toward or away from the neck wall that forms the periphery of the opening having a diameter.

Another illustrative embodiment of the present disclosure provides a universal closure valve adapter attachable to a neck wall of a first container that forms a periphery of an opening having a diameter. The universal closure valve adapter comprises: a closure valve assembly that includes a valve member biased to a closed position, wherein the closure valve assembly is attachable to a closure valve assembly of a second container, wherein the closure valve assembly of the second container is configured to open the valve member of the closure valve assembly of the first container to form a closed-loop fluid transfer system between the first and second containers; a flange transversely extending from the closure valve assembly of the first container; wherein the flange is configured to set onto the neck wall that forms the periphery of the opening having a diameter of the first container; and an elastomeric cord that wraps around both the closure valve assembly of the universal closure valve adapter and the neck wall that forms the periphery of the opening of a diameter of the first container.

In the above and other embodiments, the universal closure valve adapter may further comprise: the flange including a least one tab extending therefrom so at least a portion of the elastomeric cord that wraps around both the closure valve assembly of the universal closure valve adapter and the neck wall that forms the periphery of the opening having a diameter; and the flange including a plurality of spaced apart notches located at the periphery of the flange, wherein each of the spaced apart notches receives a portion of the elastomeric cord.

Another illustrative embodiment of the present disclosure provides a universal closure valve adapter attachable to a neck wall of a first container that forms a periphery of an opening of a diameter. The universal closure valve adapter comprises: a closure valve assembly that includes a valve member biased to a closed position, wherein the closure valve assembly is attachable to a closure valve assembly of a second container, wherein the closure valve assembly of the second container is configured to open the valve member of the closure valve assembly of the first container to form a closed-loop fluid transfer system between the first and second containers; a housing extending from the closure valve assembly of the universal closure valve adapter; wherein the housing includes a threaded surface and a flange that extends transversely from the housing and with the opening of a diameter of the first container; a compression ring with a threaded surface and a flange extending transversely from the compression ring and within the opening of having a diameter of the first container; wherein the flange of the housing is spaced apart from the flange of the compression ring; wherein the threaded surface of the housing engages and cooperates with the threaded surface of the compression ring so movement of either of these threaded surfaces with respect to each other causes the flange of the compression ring to be moved toward the flange of the housing; and a seal member located between the flange of the compression ring and the flange of the housing; wherein the flange of the compression ring and the flange of the housing compress the seal member to fill space in the opening of a diameter of the first container that seals the first container from the exterior of the first container.

In the above and other embodiments, the universal closure valve adapter may further comprise: the compression seal further comprising a flange that covers at least a portion of the opening of a diameter of the first container adjacent the universal closure valve adapter; and the seal member being selected from the group consisting of an elastic tube, O-ring, gasket, and bellowed member.

Additional features and advantages of the universal closure valve adapter will become apparent to those skilled in the art upon consideration of the following detailed descriptions.

BRIEF DESCRIPTION OF THE FIGURES

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
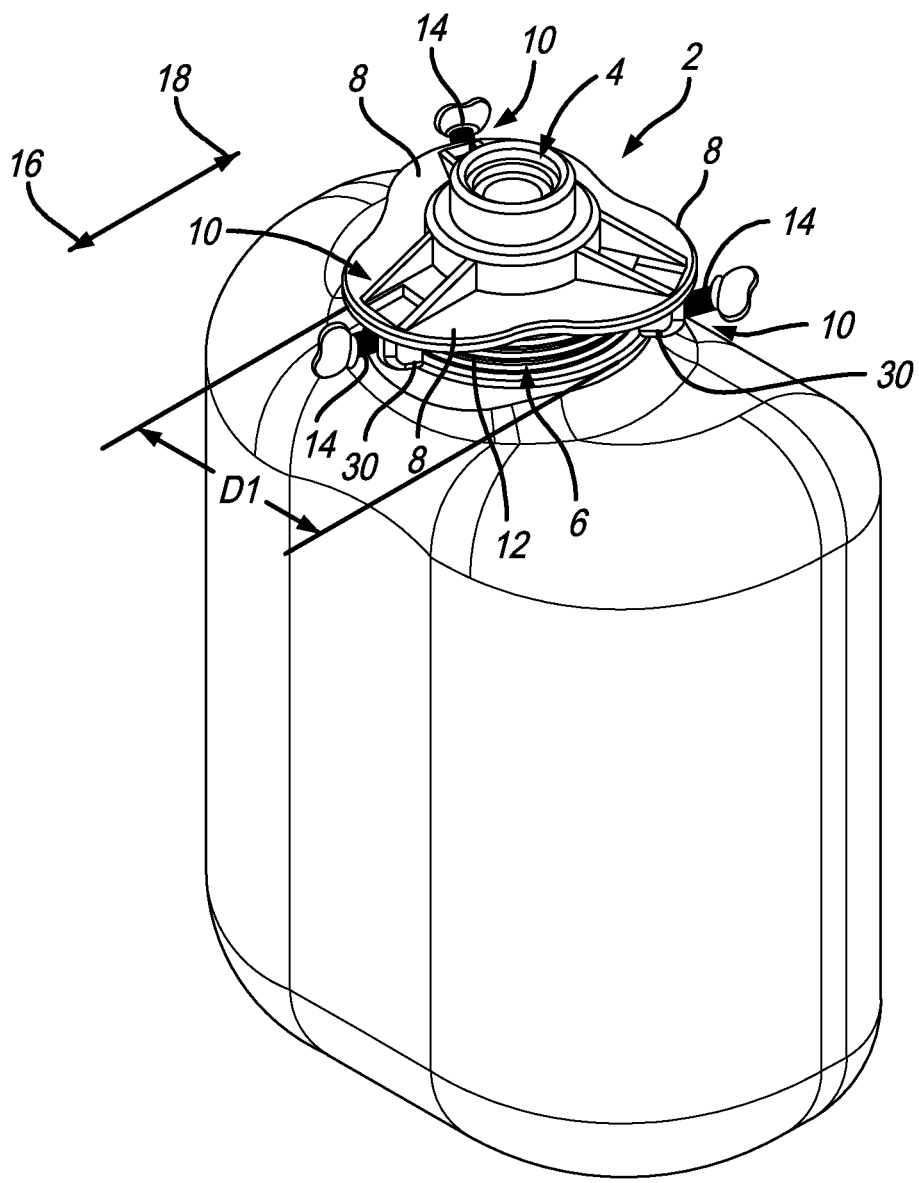
FIG. 1 is a perspective view of a tank with a universal closure valve adapter attached thereto.

Corresponding reference characters indicate corresponding parts throughout the several views. The exemplification set out herein, illustrates embodiments of the universal closure valve adapter and such exemplification is not to be construed as limiting the scope of the universal closure valve adapter in any manner.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides an automatic-closing dispense nozzle that may be coupled to a closed-loop fluid handling system such as those previously identified in the '840 and '543 patents, and in the foregoing patent applications. The dispense nozzle having a closure valve is configured to engage and open another closure valve when an operator is activating the dispense nozzle. When that is not happening, both closure valves are moved back to their closed positions. For example, a dispense nozzle attached to a first container has a closure valve that may be configured to be placed onto the closure valve of a second container and rotated. The act of rotating the dispense nozzle causes its closure valve to open as well as open the closure valve of the second container. This allows fluid transfer from the first container into the second container. A bias or other similar-type force, however, may be employed so that once the dispense nozzle is released, it force-closes its closure valve. This means the closure valve of the second container will close as well. Accordingly, the closure valves of both containers will remain closed unless actively opened and held open.

Illustratively, the dispense nozzle includes a spring or other bias member that must be overcome by the operator in order to open the closure valve. While the operator overcomes that spring force, the closure valve may be kept open allowing fluid to pass through. Once there is no longer movement or holding force to overcome the spring force, the spring moves the closure valve to its default closed condition. This arrangement may serve as a safety feature in addition to a dispensing means so the closure valve will only be opened and stay open when purposefully made to do so.

Each of the disclosed illustrative embodiments includes a depiction of such an automatic-closing dispense nozzle being coupled to a container such as an illustrative sprayer tank. The depicted tank is part of an illustrative backpack spray system which is widely used in many applications. Because there are many different type and sizes of sprayer tanks and other containers, there is a need for flexibility in being able to dispense fluid from a closed-loop supply container to any variety of sprayer tanks or other containers. It is appreciated that this variety of sprayer tanks and other containers will incorporate inlet orifices or openings of varying diameters.

Accordingly, it will be useful to provide a closure valve adapter that is useable on tanks having varying inlet orifice diameters. This allows the same closure valve to attach to many different tanks and other containers. To that end, an aspect of the present disclosure provides a universal closure valve assembly. Use of the term "universal" means the same closure valve adapter may be used on different tanks or other fluid containers where each has a different or unknown opening diameter. For instance, a universal closure valve adapter may attach to the opening of a first tank having an opening of a first diameter, as well as attaching to a second tank with an opening of a second diameter that is smaller than the first diameter of the first tank. In other words, the universal closure valve adapter is attachable to either one of those different-sized openings on the different tanks.

As an additional embodiment of the present disclosure, the universal closure valve adapter may be configured so as to secure onto threaded tank openings of differing diameters. For instance, a first tank may include a threaded periphery on its first opening. The universal closure valve adapter may be able to not only fit over that opening but also engage the threads of that opening to secure the universal closure valve adapter over the opening. Similarly, a second tank with the opening of a second diameter may likewise receive that very same universal closure valve adapter. The universal closure valve adapter is adjustable so as to engage that opening as well. In an illustrative embodiment, the universal closure valve adapter may include an adjustable pin, screw, thread follower, or other like structure, that is adjustable transversely toward or away from the threaded wall of the tank opening. This means that whatever diameter of the threaded tank opening, the adjustable thread follower can be moved as necessary, so the adjustable thread follower engages the threaded wall of the tank opening. At this point, the universal closure adapter can be secured to the threaded opening.

It is appreciated that in some embodiments, the adjustable pin, screw, thread follower, or other like structure, may serve as a kind of wedge between the threaded wall of the tank opening and the portion of the universal closure adapter that secures to the adjustable pin, screw, thread follower, or other like structure. In another illustrative embodiment, elastic cords or bands may be able to be strung about both the universal closure adapter and the threaded wall of the tank opening to secure the same together. In a further illustrative embodiment, a seal also acting as a wedge may be used about the periphery of the universal closure valve adapter and engage an interior portion of the side wall of the tank opening. The seal may be sized so it may fill the space between the closure valve and the interior portion of the side wall for a variety of tank openings having a variety of diameters. In each instance, the universal closure valve adapter employs a securement mechanism that is adjustable with respect to the tanks' openings so that the same adapter may be used with any variety of tanks having openings of any variety of diameters or even unknown diameters.

Accordingly, a perspective view of such a tank 1 is shown in FIG. 1. It will be appreciated by the relevant skilled artisan that tank 1 may be of no specific size or shape. A universal closure valve adapter 2, which houses a closure valve 4, is shown attached to tank 1. This closure valve 4 may operate similar to the type disclosed in the '840, '543 patents and forgoing applications, incorporated herein by reference. It is appreciated that the configuration and size of tank 1 is illustrative as is its inlet orifice or opening 6. It is contemplated that universal closure valve adapter 2 is adaptable so it may attach to such inlet opening types regardless of their size. In particular, universal closure valve adapter 2 includes a transversely extending flange having illustrative opposed petals 8 positioned in a generally triangular arrangement as shown. It is appreciated, however, that such arrangement and number of petals 8 may be increased or decreased, may be opposed to each other, or located adjacent to each other. Petals 8 each include a tank neck engagement assembly 10. Each tank neck engagement assembly 10 is configured to engage neck wall 12 that forms opening 6. Particularly, each tank neck engagement assembly 10 further includes a retaining screw 14 configured to move in directions 16 and 18 away from or toward neck wall 12. Each retaining screw 14 is held by an illustrative swivel member 20 located in swivel member housing 30. As further discussed herein, because of the transverse movement of each retaining screw 14 disposed through swivel member housing 30, each retaining screw independently engages neck wall 12. This means the diameter of neck wall 12 is no longer a salient issue. As such, opening 6 of tank 1 may have a diameter D1 that universal closure valve adapter 2 may attach to. If opening 6 had a different diameter, either larger or smaller than D1, universal closure valve adapter 2 is expected to accommodate those diameters as well. Whatever those diameters are, each of retaining screws 14 may be independently moved sufficiently in either direction 16 or 18 to engage neck wall 12 of opening 6 having any variety of diameters. As such, the same universal closure valve adapter 2 may be used with a tank having any variety or even undetermined opening diameter.

Figure 2A:
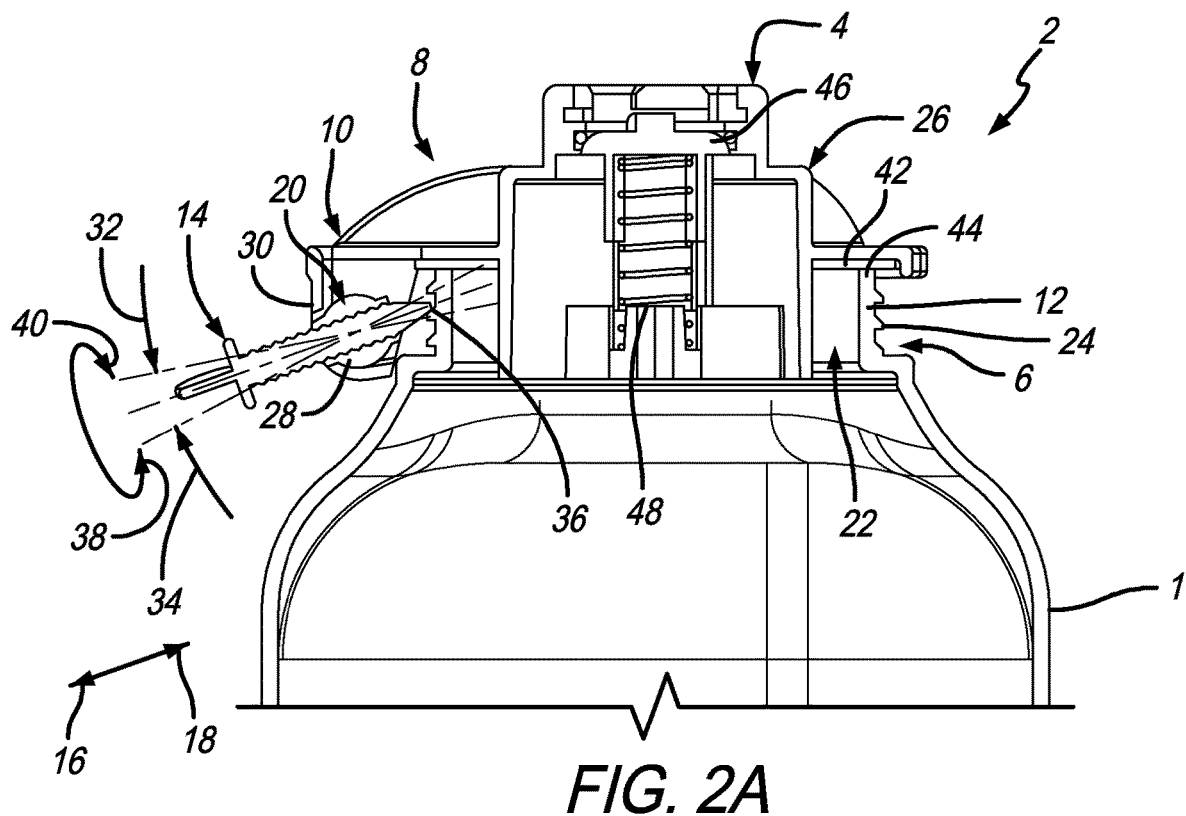
FIG. 2A is a cross sectional view of the tank of FIG. 1 with the universal closure valve adapter attached thereto.

A cross sectional view of tank 1 and universal closure valve adapter 2 is shown in FIG. 2A. Tank 1 includes an interior passageway 22 of opening 6. Illustratively, an exterior thread form 24 is located on neck wall 12. It is appreciated that such exterior thread form 24 is typically configured to receive a mating threaded cap. Pursuant this disclosure, however, the mating cap may be replaced with universal closure valve adapter 2 for fluid transfer purposes. In the illustrated embodiment, universal closure valve adapter 2 comprises a housing 26 that contains closure valve 4. A plurality of flange petals 8 extend from and are positioned about housing 26. Each petal retains a tank neck engagement assembly 10. It will be appreciated by the skilled artisan upon reading this disclosure that the design of flange petals 8 is illustrative. As such, other configurations contemplated herein may include a circular or other shaped flange that can accommodate the plurality of tank neck engagement assemblies 10.

Retaining screws 14 are disposed in swivel member 20 in swivel member housing 30 as illustratively shown. Each tank neck engagement assembly 10 includes a retaining screw 14 disposed through swivel member 20 in swivel member housing 30 to engage exterior thread form 24 on neck wall 12. It is appreciated that universal closure valve adapter 2 may include a plurality of retaining screws 14 each disposed in a respective swivel member 20 spaced about universal closure valve adapter 2 (see also, FIG. 1) to secure universal closure valve adapter 2 onto tank 1.

Illustratively, swivel member 20 may include a threaded bore 28 configured to receive retaining screw 14. Swivel member 20 may be fitted onto housing 30 and movable therein. Illustratively, swivel member 20 is movable in directions 32 and 34 inside housing 30 of tank neck engagement assembly 10. Retaining screw 14 further includes a head 36 that is engageable with threaded form 24 on neck wall 12. Additionally, retaining screw 14 is rotatable in directions 38 and 40 to move retaining screw 14 in either direction 16 or 18 away from or toward neck wall 12. It is appreciated from this view how the range of movement in directions 16, 18, 32, 34, 38, and 40 of retaining screw 14 allows substantial adjustment to accommodate any variety of sizes of opening 6. Illustratively, such plurality of tank neck engagement assemblies 10 may be located in an illustrative triangular configuration as discussed with respect to FIG. 1.

As further shown, universal closure valve adapter 2 includes a seal 42 located on the underside of flange petals 8 of housing 26. Seal 42 is configured to engage a top rim 44 of neck wall 12 of opening 6. It is appreciated that seal 42 will have a radial width sufficient to engage top rims of tank openings of any variety of diameters. Also shown in this view is closure valve 4 which includes valve member 46 biased toward its closed position via spring 48. It is appreciated that the characteristics of closure valve 4 shown herein, are illustrative only, and may alternatively have characteristics of any of the valve assemblies as disclosed in the previously identified incorporated references. This includes the methods of operation of closure valves and other valve assemblies in the incorporated documents that allow a container such as container 50 (see FIG. 3), to open the connecting valves and allow fluid to selectively transfer from container 50 to tank 1 through closure valve 4 of universal closure valve adapter 2.

Figure 2B:
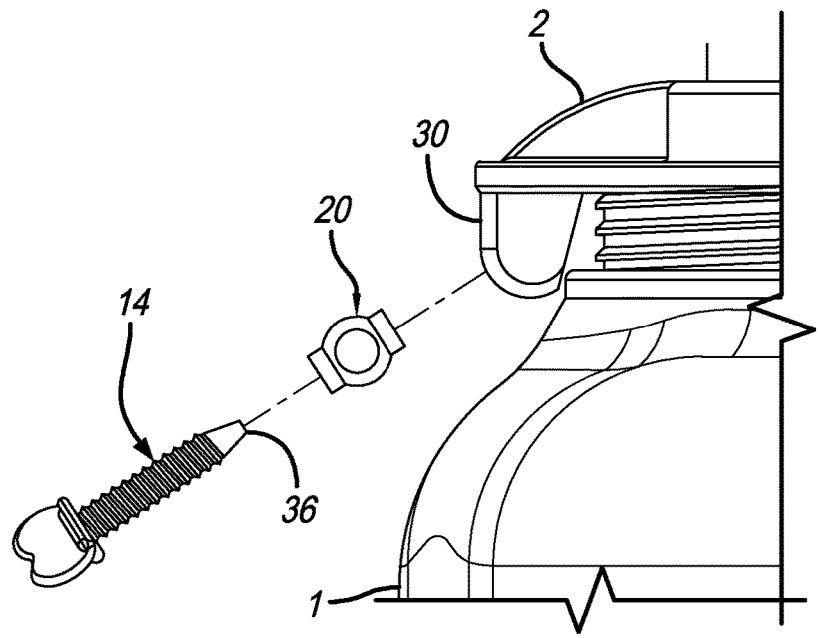
FIG. 2B is a partially-exploded detail view of a portion of the tank of FIG. 1 with the universal closure valve adapter attached thereto.

A cross-sectional partially-exploded detail view of tank 1 and universal closure valve adapter 2 is shown in FIG. 2B. This view also depicts a partial exploded view of retaining screw 14 and swivel member 20. Retaining screw 14 is disposable through swivel member 20 held in housing 30. Retaining screw 14 may, thus, swivel or pivot with respect to housing 30 and tank 1 as previously discussed to engage and securely attach to neck wall 12.

Figure 3:
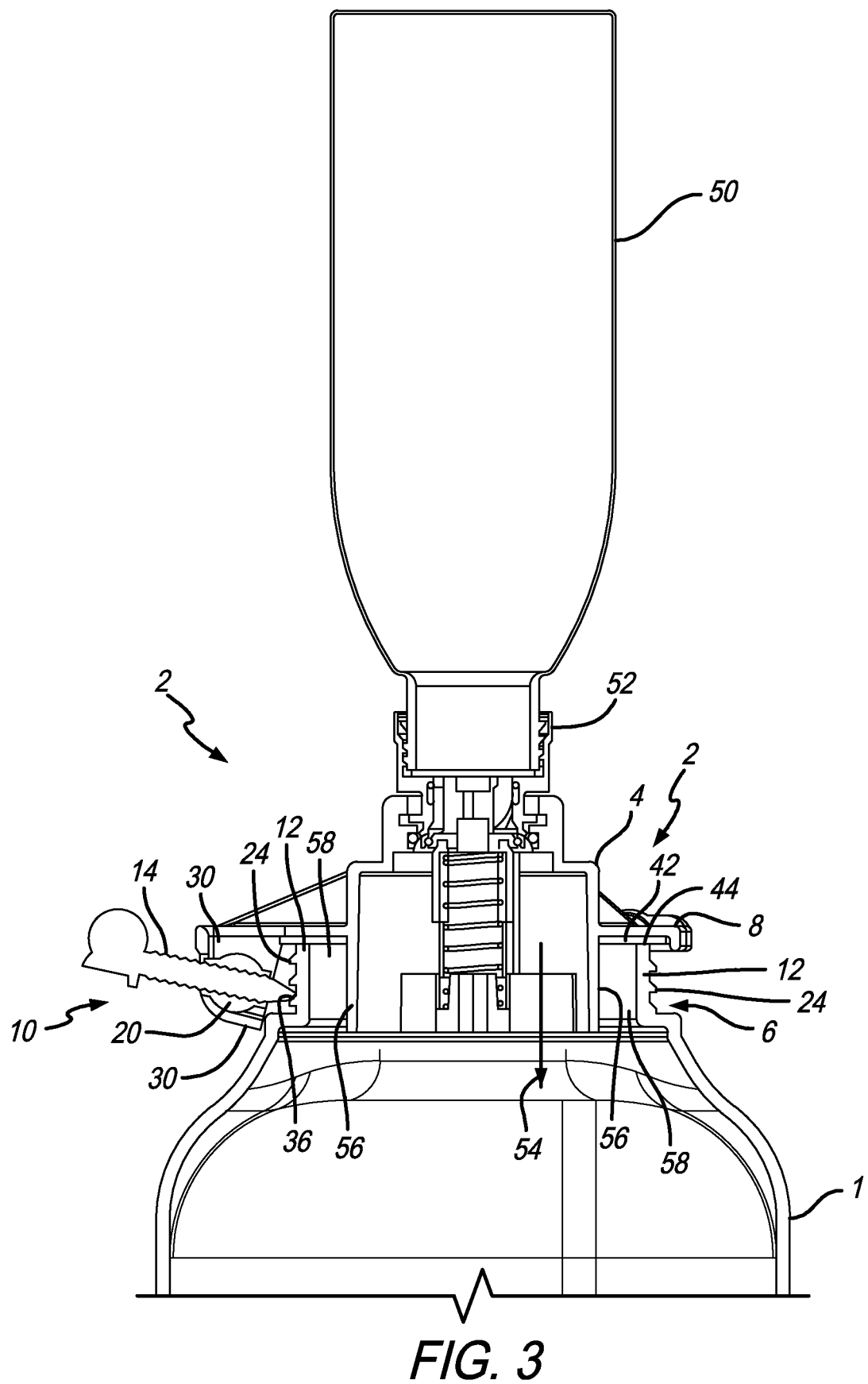
FIG. 3 is a cross sectional view of a portion of the tank with the universal closure valve adapter attached thereto and a chemical dispenser container attached to the universal closure valve adapter.

A cross sectional view of tank 1 and universal closure valve adapter 2 is shown in FIG. 3. Container 50 is attached to universal closure valve adapter 2, via closure valve 52, coupling to closure valve 4. Further depictions of like connections are disclosed in the incorporated '840 and '543 patents and foregoing incorporated applications. Container 50 may couple to tank 1 by employing universal closure valve adapter 2 without knowing the actual diameter of opening 6. With head 36 of retaining screw 14 engaging neck wall 12 at multiple opposed locations about neck wall 12 of opening 6, universal closure adapter 2 secures to neck wall 12 sufficiently to allow selective communication between closure valves 52 and 4.

It is appreciated, that an illustrative embodiment closure valve 4 provides a relatively narrow passageway 54 that illustratively extends into a portion of opening 6 so fluid can pass there through from container 50, regardless of the diameter of opening 6. In a further illustrative embodiment, a collar 56 encircles narrow passageway 54 and is configured to extend into opening 6. Collar 56 is also spaced apart from housing 30 that receives swivel member 20 to allow sufficient clearance between collar 56 and housing 30. A space 58 is located there between to accommodate tank openings of a variety of diameters. It is still further appreciated that this space 58, between collar 56 and housing 30, may vary and still be within the scope of the present disclosure. With multiple retaining screws 14 engaged with exterior thread form 24 at opposing positions (such as in an illustrative triangle as shown in FIG. 1) container 50 may set and secure onto universal closure valve adapter 2 for purposes of dispensing fluid into tank 1.

Figure 4:
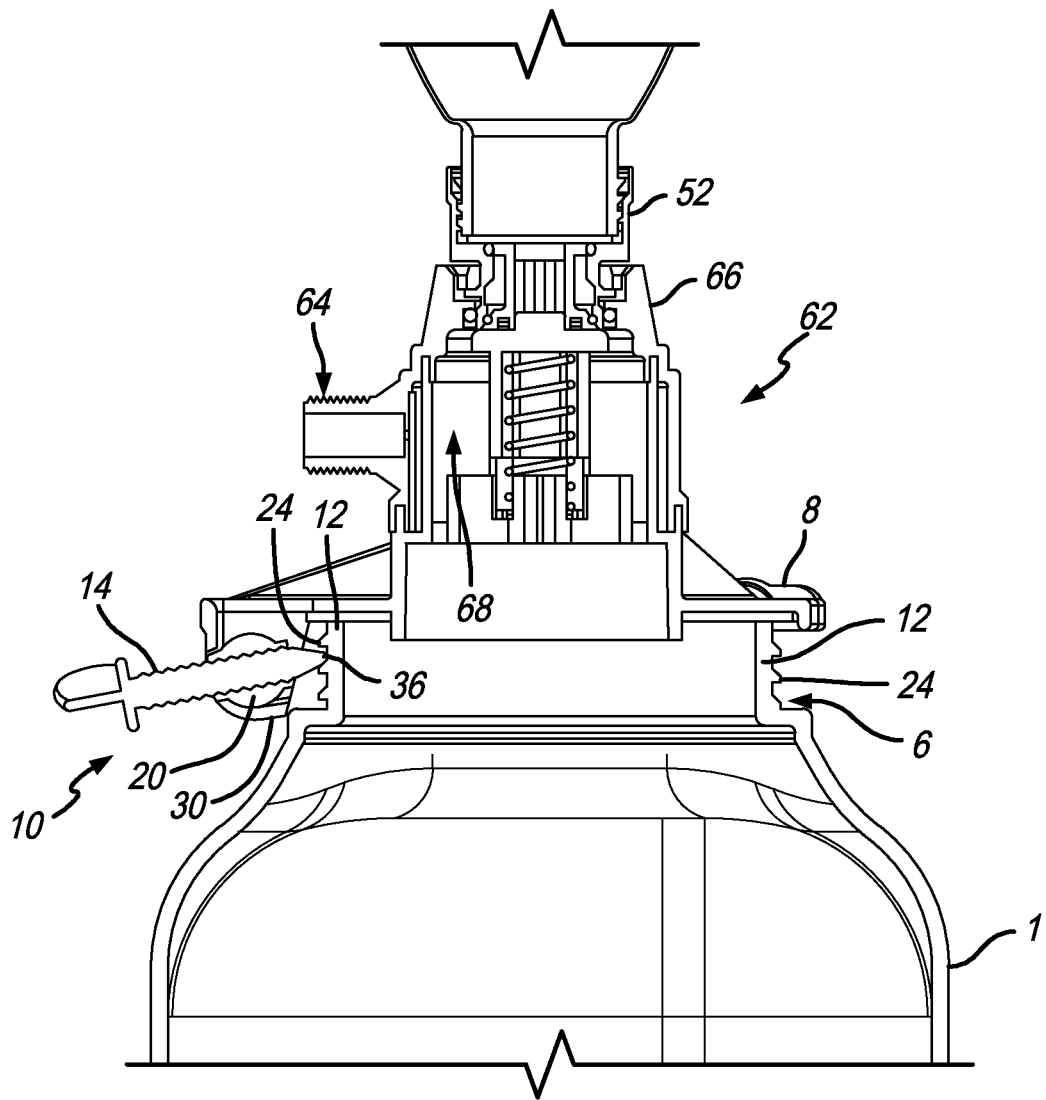
FIG. 4 is another cross sectional view of a portion of the tank with the universal closure valve adapter attached thereto and the chemical dispenser container attached to the universal closure valve adapter, wherein the universal closure valve adapter includes a rinse port.

A cross-sectional detail view of another illustrative embodiment of a universal closure valve adapter 62, with container 50 attached thereto, is shown in FIG. 4. This embodiment of universal closure valve assembly 62 differs substantively from universal closure valve assembly 2 in that a rinse port 64 has been added to closure valve 66 that is not included in closure valve 4 of the prior embodiment. Here, rinse port 64 is in fluid communication with chamber 68 of closure valve 66 to supply fluid from a separate fluid source into either or both tank 1 or container 50 (depending on whether the closure valves 66 and 52 are open or closed). Otherwise, retaining screw 14 is disposed in swivel member 20 in housing 30 with tip 36 engaging exterior thread form 24 on neck wall 12 of opening 6 of tank 1. It is appreciated that in this embodiment, petals 8 may be of similar configuration as that shown in FIG. 1 with tank neck engagement assemblies 10 positioned as also shown. It will be appreciated by the skilled artisan upon reading this disclosure that other modifications to either closure valves 4 or 66 may be made and they will still be integratable with petals 8 to allow fluid communication between container 50 and tank 1 despite opening 6 having an unknown diameter.

Figure 5:
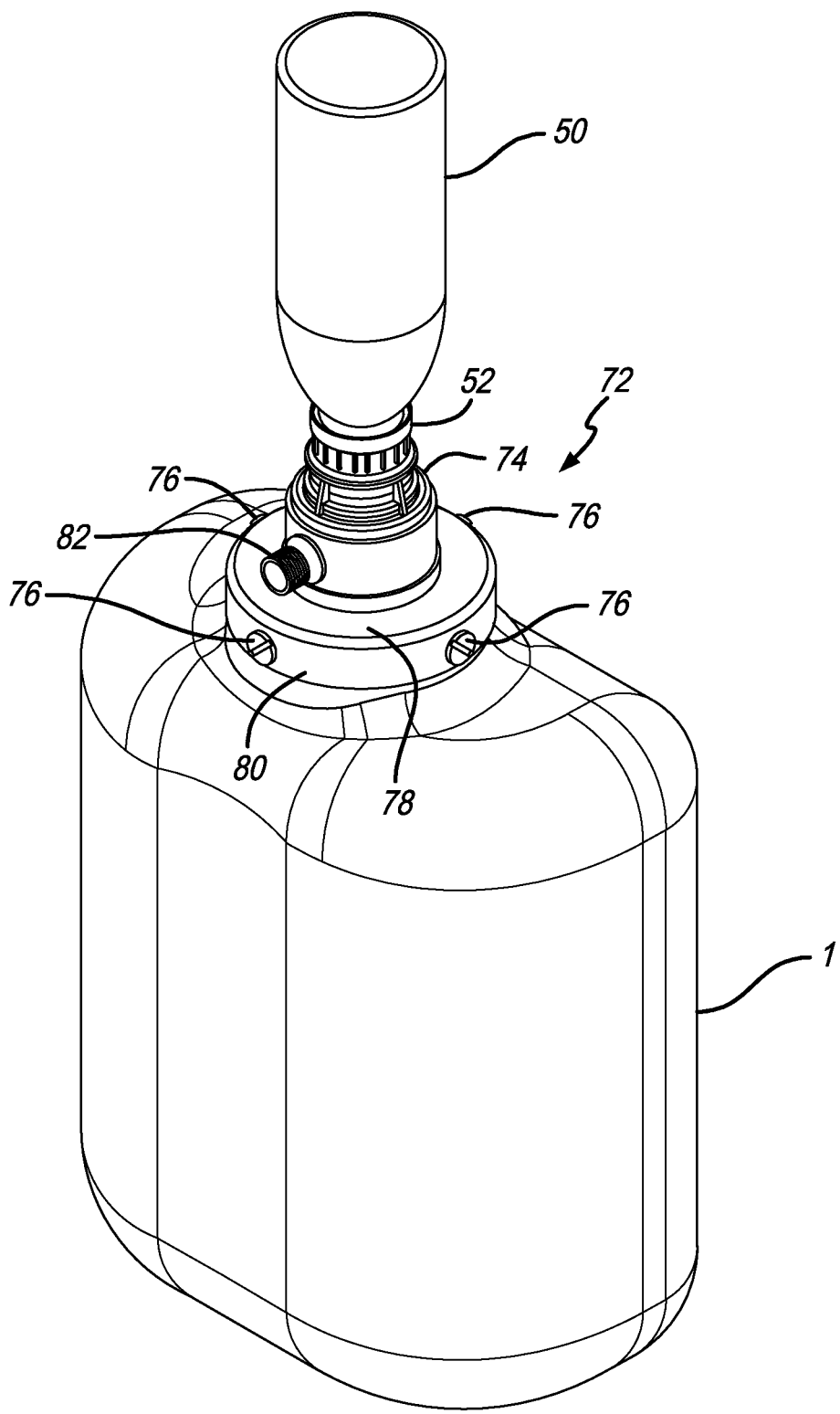
FIG. 5 is a perspective view of the tank of FIG. 1 with the universal closure valve adapter attached thereto and the chemical dispenser container attached to the universal closure valve adapter.
Figure 6:
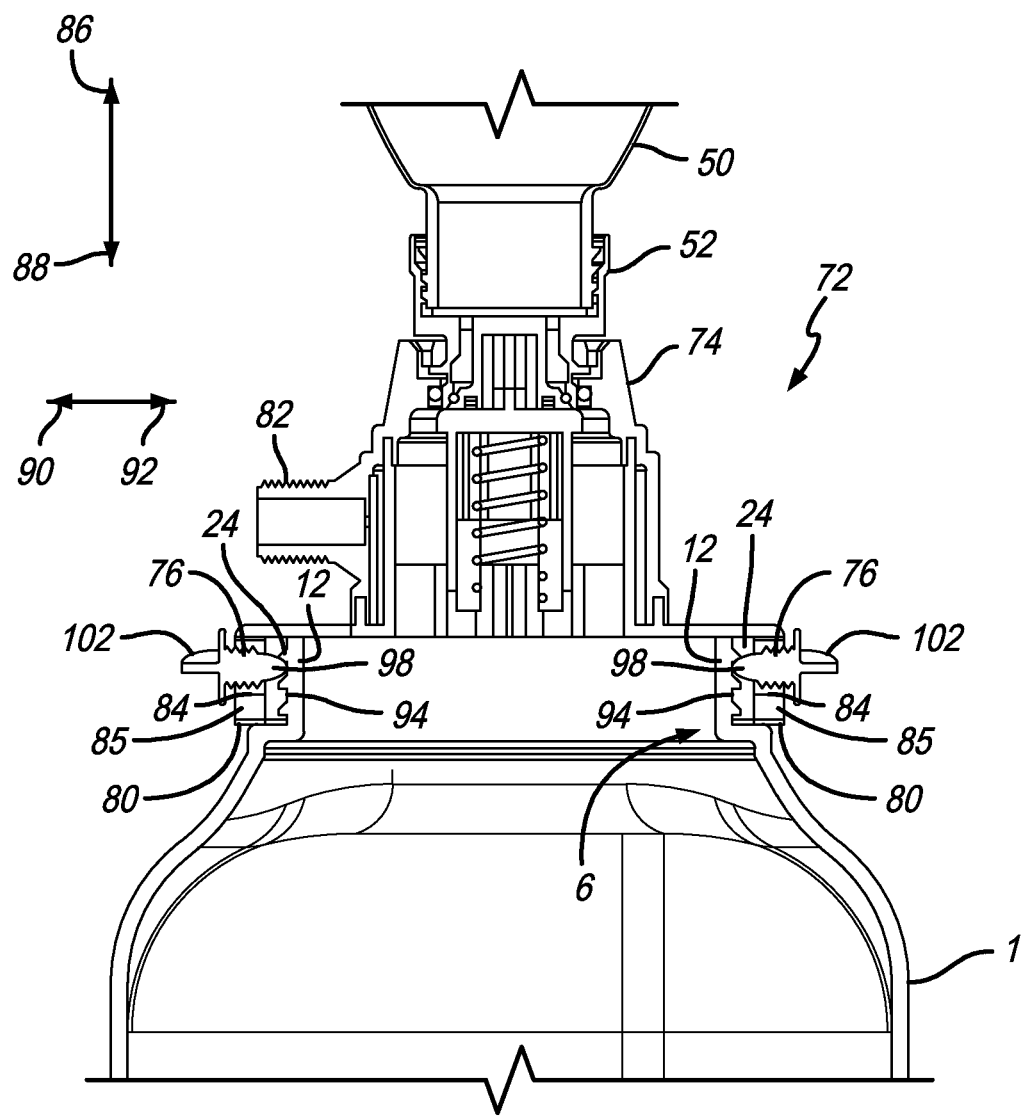
FIG. 6 is a cross sectional detail view of a portion of the tank with another illustrative embodiment of the universal closure valve adapter attached thereto and the chemical dispenser container attached to the new embodiment of the universal closure valve adapter.

Another illustrative embodiment of the present disclosure is shown in FIG. 5 and FIG. 6. These views depict an alternate thread-following or neck wall-engaging screw or pin arrangement. A perspective view of this illustrative embodiment of a universal closure valve adapter 72, attached to tank 1 with a closure valve 52 engaging a closure valve 74 on universal closure valve adapter 72, is shown in FIG. 5. In this embodiment, universal closure valve adapter 72 couples to neck wall 12 (see, also, FIG. 6) and secures to same via plurality of twist screws 76 spaced apart and located opposite each other as shown in FIG. 5. In this embodiment, closure valve 74 sets on cap 78 having a downward depending collar 80 that receives the plurality of twist screws 76. It is appreciated that neck wall 6 having tank opening 6 of any variety of diameters, including but not limited to diameter D1 (see FIG. 1), fits within collar 80. Also shown in this illustrative embodiment is a rinse port 82 extending from closure valve 74. It is appreciated that rinse port 82 may operate the same as rinse port 64 described in the prior embodiment.

A cross-sectional detail view of a portion of tank 1 and container 50 connected together via closure valves 74 and 52, respectively, is shown and FIG. 6. This view also depicts how universal closure valve adapter 72 secures onto neck wall 12 of tank opening 6. Retained in downward depending collar 80 are captive nuts 84. It is appreciated that each captive nut 84 is movable linearly in either directions 86 or 88 in slot 85 of collar 80. Captive nut 84 is retained in slot 85 so that it may only move vertically. This vertical movement allows twist screw 76, to be placed at a root 94 of exterior thread form 24 to secure universal closure valve adapter 72 to neck wall 12 of opening 6 of tank 1.

Illustratively, each twist screw 76 includes a tip 98 that may be moved in directions 90 or 92 using illustrative handle 102 to seat tip 98 against root 94 underneath a portion of exterior thread form 24. By moving twist screw in either direction 90 or 92 until it engages root 94 via cooperating threads on twist screw 76 and captive nut 84, twist screw 76 may essentially serve as a wedge between neck wall 12 and downward depending collar 80. This has the effect of securing universal closure valve adapter 72 onto neck wall 12 of opening 6 of tank 1. As shown in the illustrative embodiment, tip 98 is positioned against root 94 under a portion of exterior thread form 24 to limit it and thus universal closure adapter 72 from moving in direction 86. In other words, twist screw 76, being disposed through captive nut 84, allows movement in either horizontal or vertical directions with respect to neck wall 12 which allows twist screw 76 to engage neck wall 12 and secure universal closure valve adapter 72 to tank 1. It is appreciated that the length of twist screw 76, as well as the length of slot 85, may vary to accommodate openings of varying diameter.

Another illustrative embodiment of the present disclosure provides a universal closure valve adapter that may be secured onto tank 1 via a stretched elastomeric cord. In this embodiment, universal closure valve adapter 122 (see FIGS. 7 and 8) may include structures to guide and hold elastomeric cord that is wrapped around both the adapter and the neck wall 12 of the tank opening 6. By this means, universal closure valve adapter 122 may be set on neck wall 12 of tank 1, with the elastomeric cord wrapped around both universal closure valve adapter 122 and neck wall 12 securing both together. In this illustrative embodiment, universal closure valve adapter 122 has a closure valve 124 to assist in dispensing fluid from container 50 through closure valve 52 and into tank 1.

Figure 7:
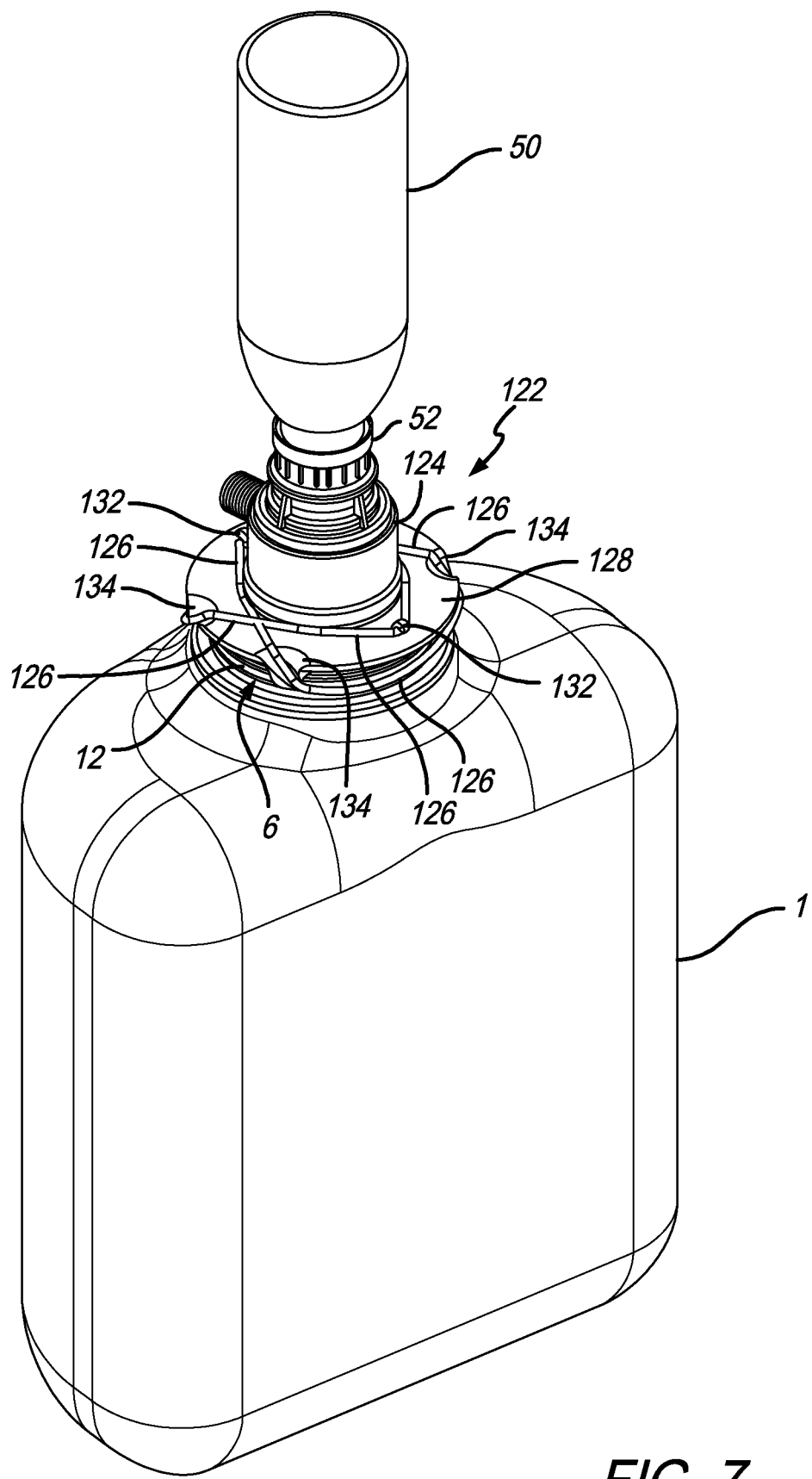
FIG. 7 is a perspective view of the tank with another illustrative embodiment of the universal closure valve adapter attached thereto and the chemical dispenser container attached to the new embodiment of the universal closure valve adapter.

To that end, a perspective view of tank 1 with bottle 50 and closure valve 52 attached to universal closure valve adapter 122, is shown in FIG. 7. Specifically, closure valve 52 is coupled to closure valve 124 on universal closure valve adapter 122. An elastomeric cord 126 is stretched about both top plate 128 of universal closure valve adapter 122 and neck wall 12 of tank 1. A plurality of tabs or hooks 132 may be periodically spaced and extend from top plate 128 to assist holding elastomeric cord 126 in a certain configuration or configurations on universal closure valve adapter 122. It is appreciated that other structures may be formed on or in universal closure valve adapter 122 to further assist guiding or holding elastomeric cord 126 in a desired position. Illustratively, top plate 128 may include a plurality of spaced apart guide notches 134 that further place and hold elastomeric cord 126 in a desired location or configuration. With respect to the elastomeric cord 126, it may be a rubber band or other elastomeric-type band or cord that is resilient to contract and hold universal closure valve adapter 122 onto neck wall 12 as illustratively shown.

Figure 8:
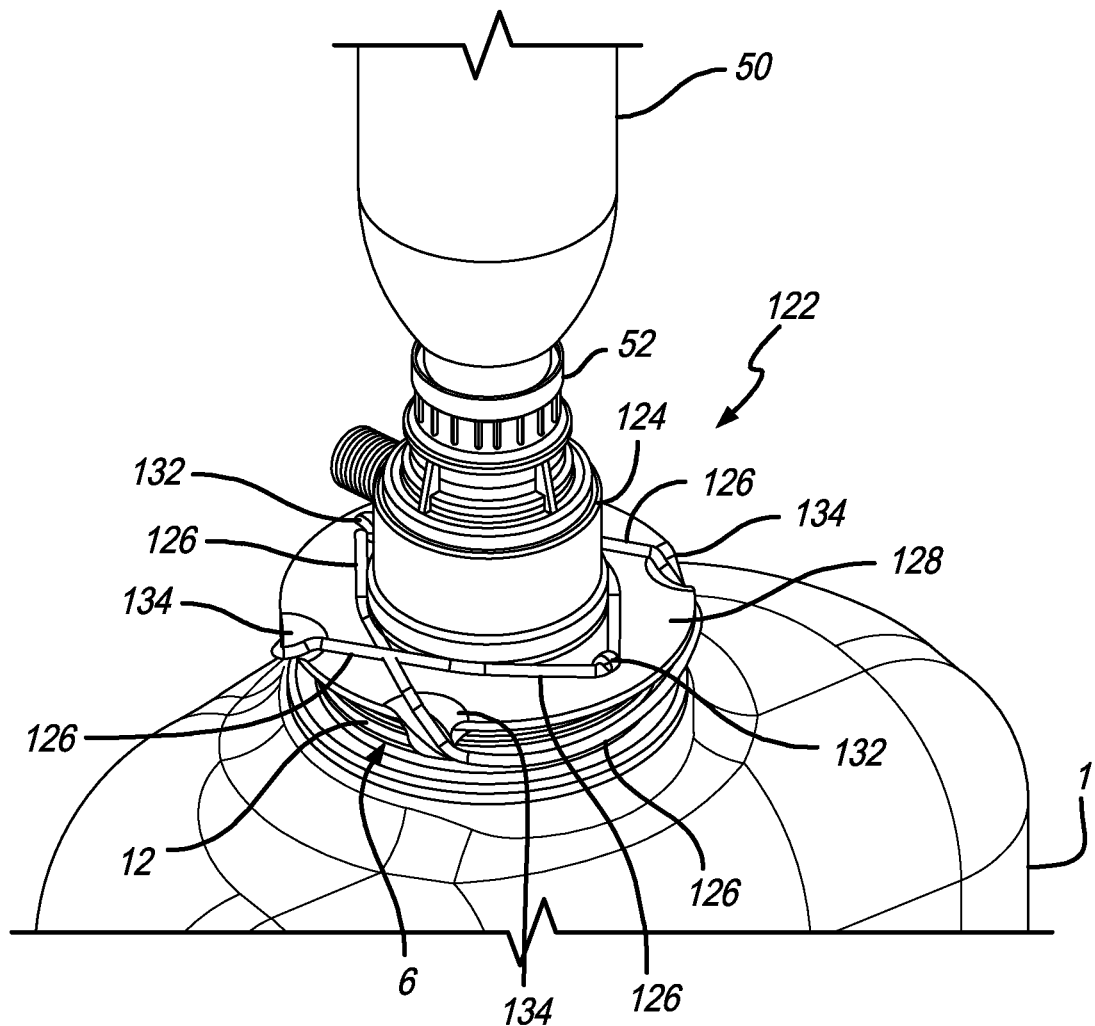
FIG. 8 is a perspective detail view of a portion of the tank with the universal closure valve adapter of FIG. 7 attached thereto and a portion of the chemical dispenser container attached to the universal closure valve adapter.

A detailed perspective view of tank 1, along with container 50 having closure valve 52 attached thereto and coupled to closure valve 124 on universal closure valve adapter 122, is shown in FIG. 8. This view further depicts how elastomeric cord 126 may be wrapped around top plate 128, as shown. Elastomeric cord 126 is held on top plate 128 via tabs or hooks 132 illustratively placed opposite each other. It is appreciated that more or fewer tabs or hooks 132 may be employed to create a different attachment path for elastomeric cord 126. Illustratively elastomeric cord may cross over itself as shown in FIGS. 7 and 8 to help secure it to both universal closure valve adapter 122 and neck wall 12.

Similarly, guide notches 134 are illustratively placed at the periphery of top plate 128 to help guide and hold elastomeric cord 126 onto neck wall 12. In this illustrative embodiment, two spaced apart guide notches 134 are positioned on each side of top plate 128. This allows elastomeric cord to wrap around closure valve 124 and neck 12 in the configuration as shown to provide a securement between neck wall 12 of tank 1 and universal closure valve adapter 122. It is appreciated that neck wall 12 may be threaded similar to the prior embodiments. Being threaded means elastomeric cord 126 may be able to fit in the thread roots (such as thread root 94, as discussed in prior embodiments) to help hold elastomeric cord 126 in place.

Figure 9:
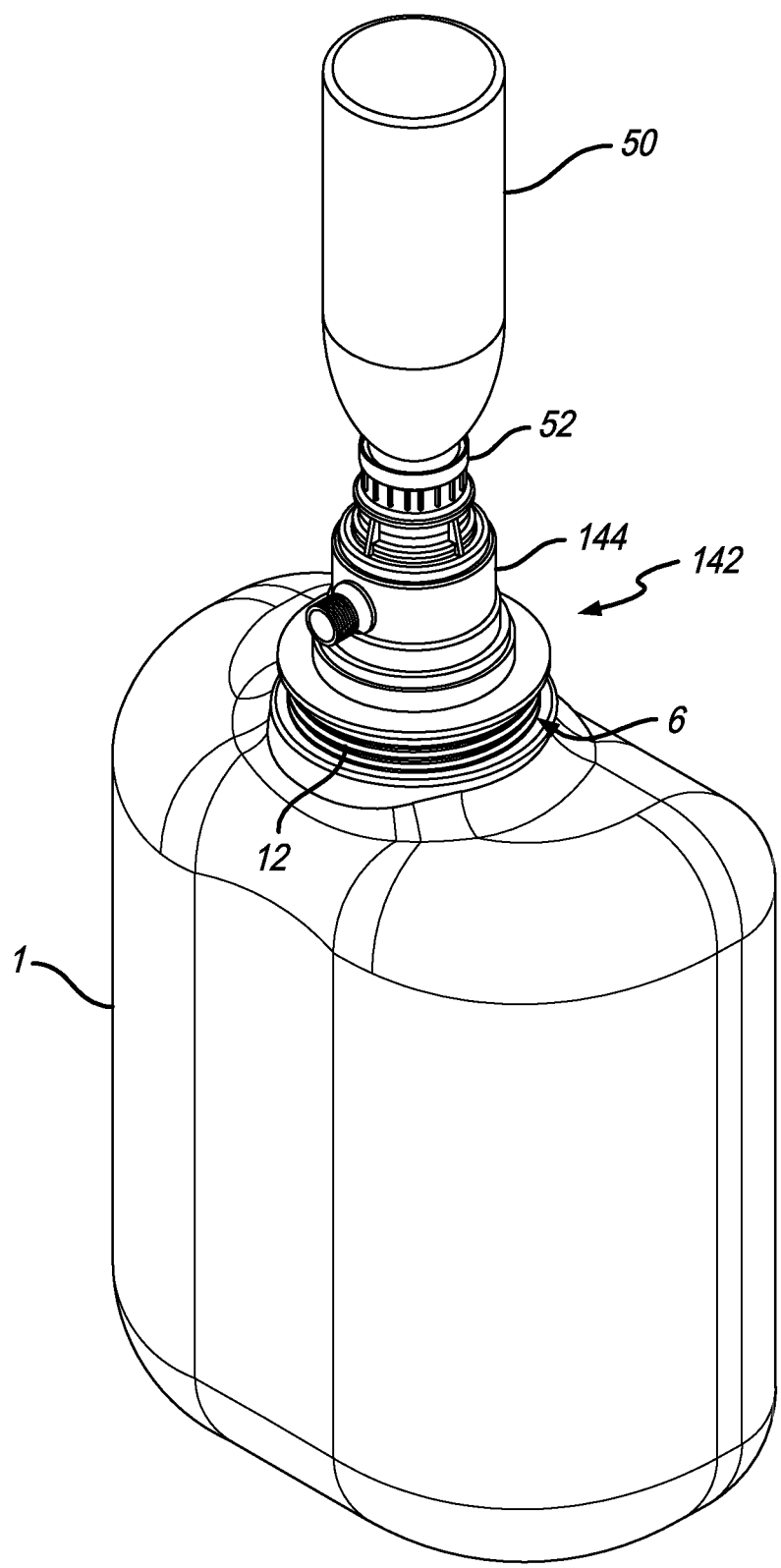
FIG. 9 is a perspective view of the tank with another illustrative embodiment of the universal closure valve adapter attached thereto and the chemical dispenser container attached to the new embodiment of the universal closure valve adapter.

Another illustrative embodiment of the present disclosure provides a closure valve that is able to selectively couple to the inside portion of an opening neck wall in tank 1. In this embodiment, the closure valve extends into the opening of the tank and has a radial compression seal to fill any gap between the valve and the inner neck wall of the tank opening. Accordingly, a perspective view of tank 1, coupled to container 50, via closure valve 52 coupling to closure valve 144 of universal closure valve adapter 142 on tank 1, is shown in FIG. 9. In this view, the securement means is located inside opening 6 of sprayer tank 1 and thus not visible from the exterior of universal closure valve adapter 142. It is contemplated that despite not knowing diameter D1 (see, also, FIG. 1) of neck wall 12 of tank 1, universal closure valve adapter 142 will fit therein.

Figure 10:
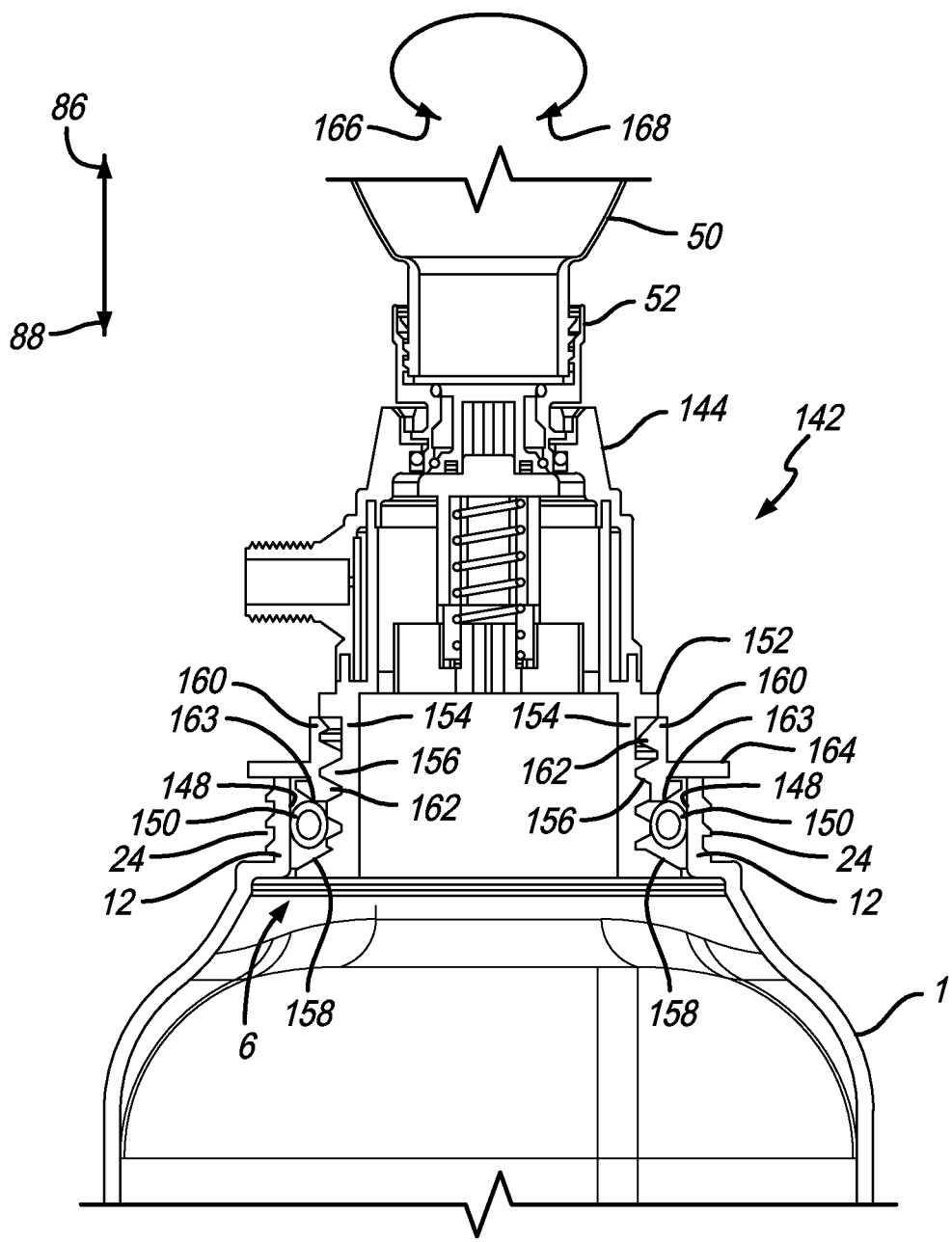
FIG. 10 is a cross sectional detail view of a portion of the tank with the universal closure valve adapter of FIG. 9 attached thereto and a portion of the chemical dispenser container attached to universal closure valve adapter.

A cross-sectional detail view of tank 1 and container 50 is shown in FIG. 10. This view depicts the interior structures of universal closure valve adapter 142 that secures it to the interior neck wall 148 of tank 1. Here, universal closure valve adapter 142 utilizes a radial compression seal 150 as illustratively shown. Housing 152 includes an illustrative collar 154 with a helical thread 156 followed by a conical flange 158 formed thereon. A compression ring 160 has a mating helical thread 162 applied thereon engageable with helical thread 156 on collar 154 of housing 152. Compression ring 160 also includes a conical flange 163 located adjacent flange 164 extending from housing 152. Flange 164 covers opening 6 at top rim 44 of neck wall 12.

Illustratively, housing 152 is held stationary, compression ring 160 is rotated in either directions 166 or 168 to cause seal member 150 to compress outwardly from collar and against interior neck wall 148 of opening 6. Conical flanges 158 and 163 are drawn together as compression ring 160 is rotated with respect to housing 152. Helical threads 156 and 162 cooperate to draw the structures together. Due to its elastic nature, radial compression seal 150 is forced to compress and expand against interior neck wall 148 to form a seal. Illustratively, radial compression seal 150 is a hollow tubular elastic member. It may, however, be a solid member such as an O-ring. Radial compression seal 150 may alternatively be a tubular flexible member which, when compressed, moves outward like a bellow to seal any void in opening 6 between universal closure valve adapter 142 and tank 1.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. To the extent any subject matter disclosed in this non-provisional patent application differs from or is perceived as in conflict with the priority application, the disclosure in this non-provisional patent application controls and supersedes the disclosure of the priority application.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A universal closure valve adapter attachable to a neck wall of a first container that forms a periphery of an opening having a diameter, the universal closure valve adapter comprises:

a closure valve assembly that includes a valve member biased to a closed position, wherein the closure valve assembly is attachable to a closure valve assembly of a second container, wherein the closure valve assembly of the second container is configured to open the valve member of the closure valve assembly of the first container to form a closed-loop fluid transfer system between the first and second containers;

a flange transversely extending from the closure valve assembly of the first container;

wherein the flange includes a plurality of tank neck engagement assemblies;

wherein each of the plurality of tank neck engagement assemblies is spaced apart from each other about the flange;

wherein each of the plurality of tank neck engagement assemblies includes a swivel member and an elongated retaining member rotatably disposed through the swivel member and having a tip;

wherein the swivel member of each of the plurality of tank neck engagement assemblies is pivotable with respect to the flange;

wherein each of the elongated retaining members are movable through its corresponding swivel member through which the elongated retaining member is disposed such that the tip of the each of the elongated retaining members is movable toward and away from the neck wall that forms the periphery of the opening having a diameter;

wherein the tip of the each of the elongated retaining members is movable so the tip of the each of the elongated retaining members engages the neck wall that forms the periphery of the opening having a diameter and secures the flange to the neck wall that forms the periphery of the opening having a diameter; and wherein the closure valve assembly is positioned in fluid communication with the opening having a diameter.

2. The universal closure valve adapter of claim 1, wherein the neck wall that forms the periphery of the opening having a diameter has a threaded surface such that the tip of the each of the elongated retaining members is engageable with the threaded surface.

3. The universal closure valve adapter of claim 1, wherein the each of the elongated retaining members has a threaded surface.

4. The universal closure valve adapter of claim 3, wherein the threaded surface of the each of the elongated retaining members is configured to engage a threaded surface of its corresponding swivel member through which the elongated retaining member is disposed so rotating the elongated retaining member moves the tip of the elongated retaining member either toward or away from the neck wall that forms the periphery of the opening having a diameter.

5. The universal closure valve adapter of claim 1, wherein the flange includes outward extending petals, wherein each petal includes one of the plurality of tank neck engagement assemblies.

6. The universal closure valve adapter of claim 1, wherein the each of the plurality of tank neck engagement assemblies is located opposite each other.

7. The universal closure valve adapter of claim 1, wherein the plurality of tank neck engagement assemblies are three tank neck engagement assemblies, wherein the three tank neck engagement assemblies are spaced apart from each other.

* * * * *